United States Patent
Mack et al.

(10) Patent No.: US 11,327,513 B1
(45) Date of Patent: May 10, 2022

(54) APPARATUS FOR MANAGING PRESSURE EVENTS IN PROTECTIVE CASINGS AND RELATED METHODS

(71) Applicant: Fisher Controls International LLC, Marshalltown, IA (US)

(72) Inventors: Christopher J. Mack, Marshalltown, IA (US); Christopher Steven Metschke, Ames, IA (US); Brett J. Pollock, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/323,674

(22) Filed: May 18, 2021

(51) Int. Cl.
  G01D 11/24 (2006.01)
  G05D 16/06 (2006.01)

(52) U.S. Cl.
  CPC ......... G05D 16/0613 (2013.01); G01D 11/24 (2013.01)

(58) Field of Classification Search
  CPC .......................... G01D 11/24; G05D 16/0613
  See application file for complete search history.

(56) References Cited

FOREIGN PATENT DOCUMENTS

| CN | 110168623 B | * | 6/2021 | ............... A62C 3/16 |
| CN | 214277329 U | * | 9/2021 | |
| RU | 2735530 C2 | * | 11/2020 | ......... B01D 46/0002 |

* cited by examiner

Primary Examiner — Jamel E Williams
(74) Attorney, Agent, or Firm — Hanley, Flight & Zimmerman, LLC

(57) ABSTRACT

Apparatus for managing pressure events in protective casings and related methods are disclosed. An example apparatus includes a first body including a pressure inlet port, a pressure outlet port, and a groove defined in a wall of the first body. The example apparatus includes a gasket at least partially disposed in the groove. The example apparatus includes a second body removably coupled to the first body. The first body and the second body define a housing. An edge of the second body is to extend over the wall of the first body. The edge includes a lip. A portion of the lip includes a notch defined therein to enable a portion of the gasket to extrude from the groove in response to a pressure event in the housing.

20 Claims, 8 Drawing Sheets

APPARATUS FOR MANAGING PRESSURE EVENTS IN PROTECTIVE CASINGS AND RELATED METHODS

FIELD OF THE DISCLOSURE

This disclosure relates generally to process control systems and, more particularly, to apparatus for managing pressure events in protective casings and related methods.

BACKGROUND

Process control systems, such as those used in oil production, refining, and power generation include instruments disposed in protective casings that provide ingress protection. Such instruments may use pressure for performing measurements, relays, etc. while secured in the protective casing.

SUMMARY

An example apparatus disclosed herein includes a first body including a pressure inlet port, a pressure outlet port, and a groove defined in a wall of the first body. The example apparatus includes a gasket at least partially disposed in the groove. The example apparatus includes a second body removably coupled to the first body to define a housing. The first body and the second body define a housing. An edge of the second body is to extend over the wall of the first body. The edge includes a lip. A portion of the lip includes a notch defined therein to enable a portion of the gasket to extrude from the groove in response to a pressure event in the housing.

An example apparatus disclosed herein includes a base including a wall defining a perimeter of the base. A slot is defined in the wall and extends along the perimeter of the base. The example apparatus includes a gasket at least partially disposed in the slot and a cover removably coupled to the base. The cover and the base define a housing. The cover includes a ridge. The ridge is to extend around an exterior of the wall of the base. A portion of the ridge includes a notch defined therein to enable a portion of the gasket to extrude from the housing in response to a pressure event in the housing.

An example instrument housing disclosed herein includes a body including a first portion including an inner wall and an outer wall, a cavity defined between the inner wall and the outer wall, and a second portion removably coupled to the first portion. The second portion includes a ledge extending about an exterior of the second portion. The ledge is to cover the cavity. The example instrument housing includes means for sealing supported by the cavity. The ledge includes an indentation to enable a portion of the means for sealing to be released from the cavity in response to a pressure event in the body.

Figure 1:
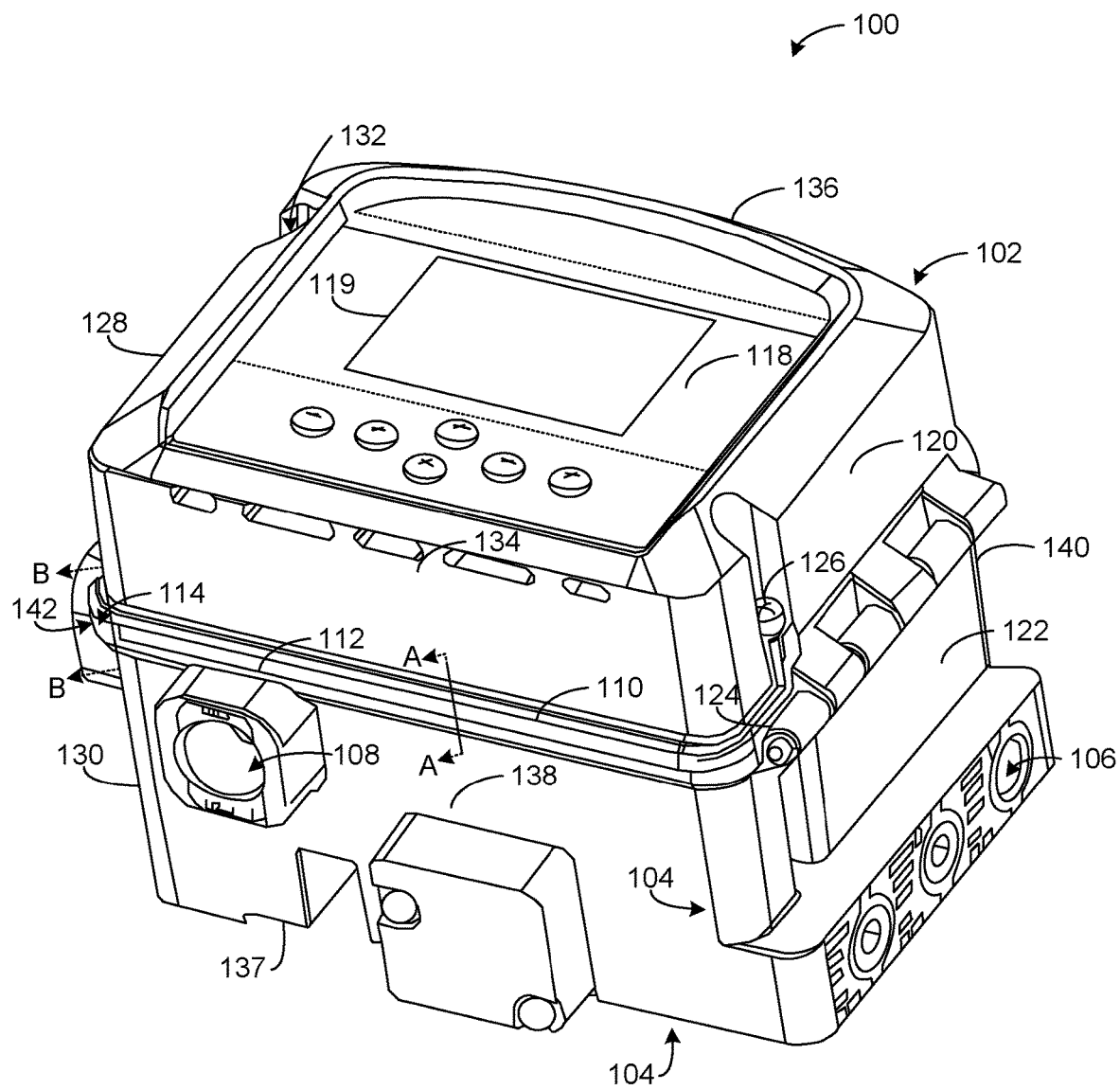
FIG. 1 illustrates an example instrument housing that provides for pressure relief in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Process control systems can include instruments that use pressure when performing measurements. Such instruments may be disposed in protective casings or housings that provide ingress protection to prevent intrusion of substances (e.g., water, dust, etc.) that could interfere with the operation of the instruments. However, sealing such a housing to prevent the intrusion of substances can also prevent the release of pressure therefrom. As such, in the event of a pressure blockage in the housing, the pressure within the housing may build up and ultimately cause damage to the housing and/or the components therein. In some instances, excess pressure in the housing can cause portions of the housing to break.

Some known housings include pressure relief valves to release pressure from the housing. Some other known housings include rupture discs, or inflating diaphragms that rupture in response to excess pressure in the housing.

However, such known pressure relieving systems may require a size of the housing to be increased to accommodate the pressure relieving systems, may add complexity to the process control system, and/or can increase manufacturing and/or maintenance costs.

Disclosed herein are example protective casings or housings that provide for release of pressure buildup within the housing while also providing ingress protection. Examples disclosed herein include a body (e.g., an enclosure, a casing, an instrument housing, etc.) having a first portion and a second portion that are removably coupled. In examples disclosed herein, a wall of the first portion of the housing includes a cavity defined therein to receive a gasket, sealing lining, or other means for sealing. The second portion of the body includes a ledge extending around an exterior thereof. The ledge covers the cavity including the gasket when the first portion and the second portion are coupled. Thus, the ledge maintains a position of the gasket within the housing, which enables the gasket to prevent water, dust, and/or other substances from entering the housing.

In examples disclosed herein, the ledge includes an indentation or notch to enable a portion of the gasket to be released from the cavity in response to pressure within the body exceeding a threshold (i.e., a pressure event). In some examples, the housing includes a material that allows at least a portion of the housing to flex in response to the pressure event without causing damage to the housing. As a result, the flexing of the housing enables the gasket to extrude from the cavity. The release of the portion of the gasket from the cavity via the notch enables pressure to be released from the body of the housing and, thus, prevents damage to the body and/or the components (e.g., process control instrument(s)) contained therein. In examples disclosed herein, a pressure threshold defines a pressure event in the housing that results in the release of the portion of the gasket from the cavity. In some examples, the pressure threshold is defined based on a durometer and/or a geometry of the gasket. In some examples, at least a portion of the gasket extrudes from the housing (i.e., is disposed external to the body) when the portion of the gasket is released from housing. As a result, example pressure relief housings disclosed herein can provide a visual indication to an operator that a pressure event has occurred.

FIG. 1 illustrates an example housing 100 in accordance with teachings disclosed herein. The housing 100 can be associated with a process control system and can house one or more components of the process control system (e.g., instrument(s)) to protect the component(s) from damage from external substances (e.g., fluid, debris). The example housing 100 of FIG. 1 includes a first body or first portion 102 and a second body or second portion 104. In the example of FIG. 1, the first portion 102 is removably coupled to the second portion 104. The first portion 102 can serve as, for instance, a cover and the second portion 104 can serve as a base of the housing 100. The first portion 102 of the housing 100 is defined by a face 118, a first sidewall 120, a second sidewall 128 opposite the first sidewall 120, a third sidewall 134, and a fourth sidewall 136 opposite the third sidewall 134. The first sidewall 120, the second sidewall 128, the third sidewall 134, and the fourth sidewall 136 of the first portion 102 of the housing 100 extend from the face 118 and define a perimeter of the first portion 102. The first and second portions 102, 104 of the housing 100 can include a material such as an aluminum die cast material.

The second portion 104 of the housing is defined by a face 137, a first sidewall 122, a second sidewall 130 opposite the first sidewall 122, a third sidewall 138, and a fourth sidewall 140 opposite the third sidewall 138. The first sidewall 122, the second sidewall 130, the third sidewall 138, and the fourth sidewall 140 of the second portion 104 of the housing 100 extend from the face 137 and define a perimeter of the second portion 104. Although the example housing 100 of FIG. 1 is shown as having a substantially rectangular shape, the housing 100 can have other shapes and/or sizes.

In FIG. 1, the first portion 102 of the housing 100 is removably coupled to the second portion 104 via a hinge 124. The first portion 102 of the housing 100 can be removably coupled to the second portion 104 of the housing 100 via other types of mechanical fasteners (e.g., screws, clamps, etc.). The housing 100 of FIG. 1 includes a first fastener 126 and a second fastener 132 to secure the coupling between the first and second portions 102, 104 of the housing 100. The first fastener 126 and/or the second fastener 132 can include, for instance, a screw, a bolt, etc. Alternatively, the first fastener 126 and/or the second fastener 132 can be implemented using a lock pin, a latch, etc. The locations of the hinge 124, the first fastener 126, and/or the second fastener 132 can differ from the examples shown in FIG. 1.

The example housing 100 of FIG. 1 includes a pressure inlet port 106 and a pressure outlet port 108. In the example of FIG. 1, the pressure inlet port 106 and the pressure outlet port 108 are defined in the second portion 104 of the housing 100. In other examples, one or more of the pressure inlet port 106 or the pressure outlet port 108 are defined in the first portion 102 of the housing 100. In some examples, the pressure inlet port 106 is fluidly coupled to a pressure supply source (e.g., plant air, process gas, etc.). An interior of the housing 100 includes a flow path defined between the pressure inlet port 106 and the pressure outlet port 108. In some examples, the housing 100 includes one or more sensors (e.g., a pressure sensor, a flow sensor, etc.) positioned at one or more of the pressure inlet port 106, the pressure outlet port 108, and/or the interior flow path to detect operating conditions associated with the process control system. In some examples, the face 118 of the first portion 102 of the housing 100 includes a display 119 to display measurements generated by the sensor(s).

In the example of FIG. 1, the first portion 102 of the housing 100 includes a ridge 112 (e.g., a lip, a rim, a ledge). As shown in FIG. 1, the ridge 112 extends along at least a portion of an edge 110 of the first portion 102 of the housing 100 defined by the sidewalls 120, 128, 134, 136. Put another way, the ridge 112 extends about at least a portion of the perimeter of the first portion 102 of the housing 100. For instance, the ridge 112 can extend at least partially around an exterior of the first, second, third, and/or fourth sidewalls 120, 128, 134, 136 of the first portion 102 of the housing 100. In other examples, the second portion 104 of the housing 100 includes the ridge 112. A shape and/or size of the ridge 112 can differ from the example shown in FIG. 1. A portion of the ridge 112 includes a notch 114 (e.g., an indentation, a depression, a groove, etc.) defined therein. As shown in FIG. 1, the notch 114 is defined at a corner 142 of the first portion 102 of the housing 100 between the second sidewall 128 and the third sidewall 134 of the first portion 102. In the example of FIG. 1, the notch 114 is distal to the first fastener 126 and the second fastener 132 to not interfere with the coupling of the first and second portions 102, 104 of the housing 100. However, a location of the notch 114 relative to the ridge 112 of the first portion 102 of the housing 100 can differ from the example shown in FIG. 1. Also, the notch 114 can have a different shape and/or size than the example notch 114 shown in FIG. 1. Although only one notch 114 is shown in the example of FIG. 1, the ridge 112 can includes additional notches defined therein. Also, as disclosed above, in some instances, the second portion 104 of the housing 100 can include the ridge 112 and, thus, the notch 114.

In some instances, a pressure within the housing 100 exceeds a threshold pressure. Such a pressure event may occur when, for instance, a blockage restricts or blocks the pressure outlet port 108 and/or the associated flow path in the housing 100. As disclosed herein, the notch 114 enables a portion of a gasket (FIG. 2) or other seal in the housing 100 to extrude from the housing 100 in response to the pressure event, thereby releasing pressure in the housing 100. As a result, the notch 114 prevents the pressure buildup within the housing 100 from damaging the housing 100 and/or the components therein.

Figure 2:
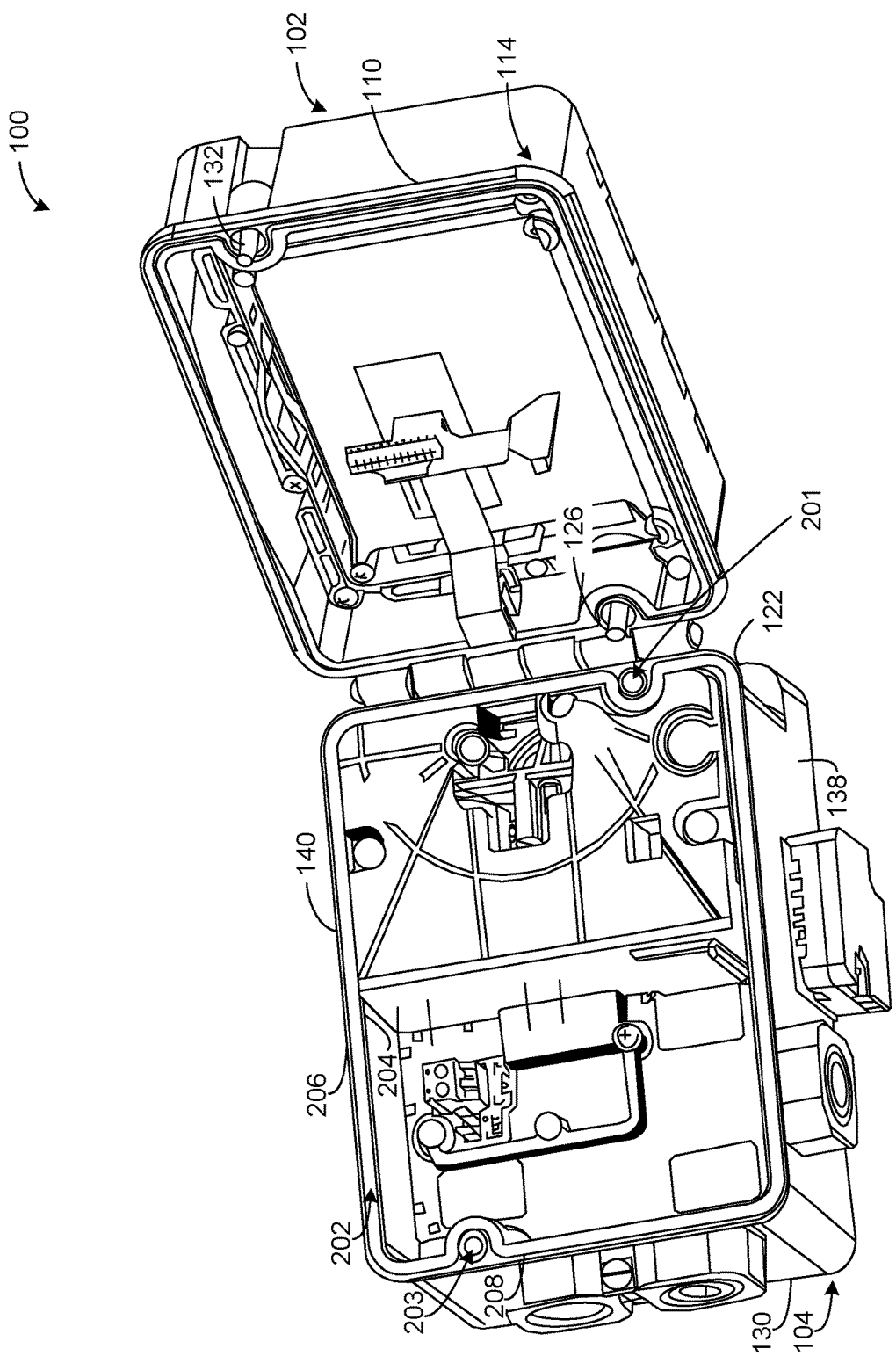
FIG. 2 illustrates an interior of the example housing of FIG. 1.

FIG. 2 illustrates the example casing or housing 100 of FIG. 1 in an open state, or a state in which the first fastener 126 and the second fastener 132 are released from coupling the first and second portions 102, 104 of the housing 100. In particular, FIG. 2 shows an example interior of the housing 100. As shown in FIG. 2, the first fastener 126 is removed from a first opening 201 defined in the first sidewall 122 of the second portion 104 of the housing 100 and the second fastener 132 is removed from a second opening 203 defined in the second sidewall 130 of the second portion 104 of the housing 100. The example housing 100 can include additional or fewer fasteners to removably secure the first and second portions 102, 104 of the housing 100.

In FIG. 2, the sidewalls 122, 130, 138, 140 of the second portion 104 of the housing 100 define a groove 202 (e.g., a slot, a cavity, etc.). As shown in FIG. 2, the groove 202 is defined between an interior surface 204 and an exterior surface 206 of the respective sidewalls 122, 130, 138, 140. As also shown in FIG. 2, a shape of the groove 202 substantially follows the perimeter of the second portion 104 of the housing 100 and includes curved portions to accommodate the locations of the openings 201, 203 that receive the fasteners 126, 132.

In FIG. 2, a gasket 208 is positioned at least partially within the groove 202 to seal the housing 100 when the first portion 102 of the housing 100 is coupled to the second portion 104 of the housing 100. A shape, size, and/or location of the groove 202 can differ from the example shown in FIG. 2.

In FIG. 2, the edge 110 of the first portion 102 of the housing 100 covers the gasket 208 when the first portion 102 is secured to the second portion 104 of the housing 100 (e.g., as shown in FIG. 1). In some examples, the edge 110 of the first portion 102 at least partially engages (e.g., clamps) the gasket 208 in the groove 202 when the first portion 102 is coupled to the second portion 104 of the housing 100. In some examples, the securing of the first and/or second fasteners 126, 132 in the respective openings 201, 203 to close the housing 100 facilitates the clamping of the gasket 208 by the edge 110 of the first portion 102 of the housing 100 in the groove 202. The gasket 208 seals the housing 100 and, thus, the pressure therein. As such, the gasket 208 provides the housing 100 with ingress protection from water, dust, and/or other substances. The gasket 208 can include an elastomer, such as silicone or nitrile. Additionally or alternatively, the gasket 208 can include other types of elastomeric materials and/or other types of materials that provide for sealing and are capable of extruding from the groove 202 in response to pressure events.

Figure 3:
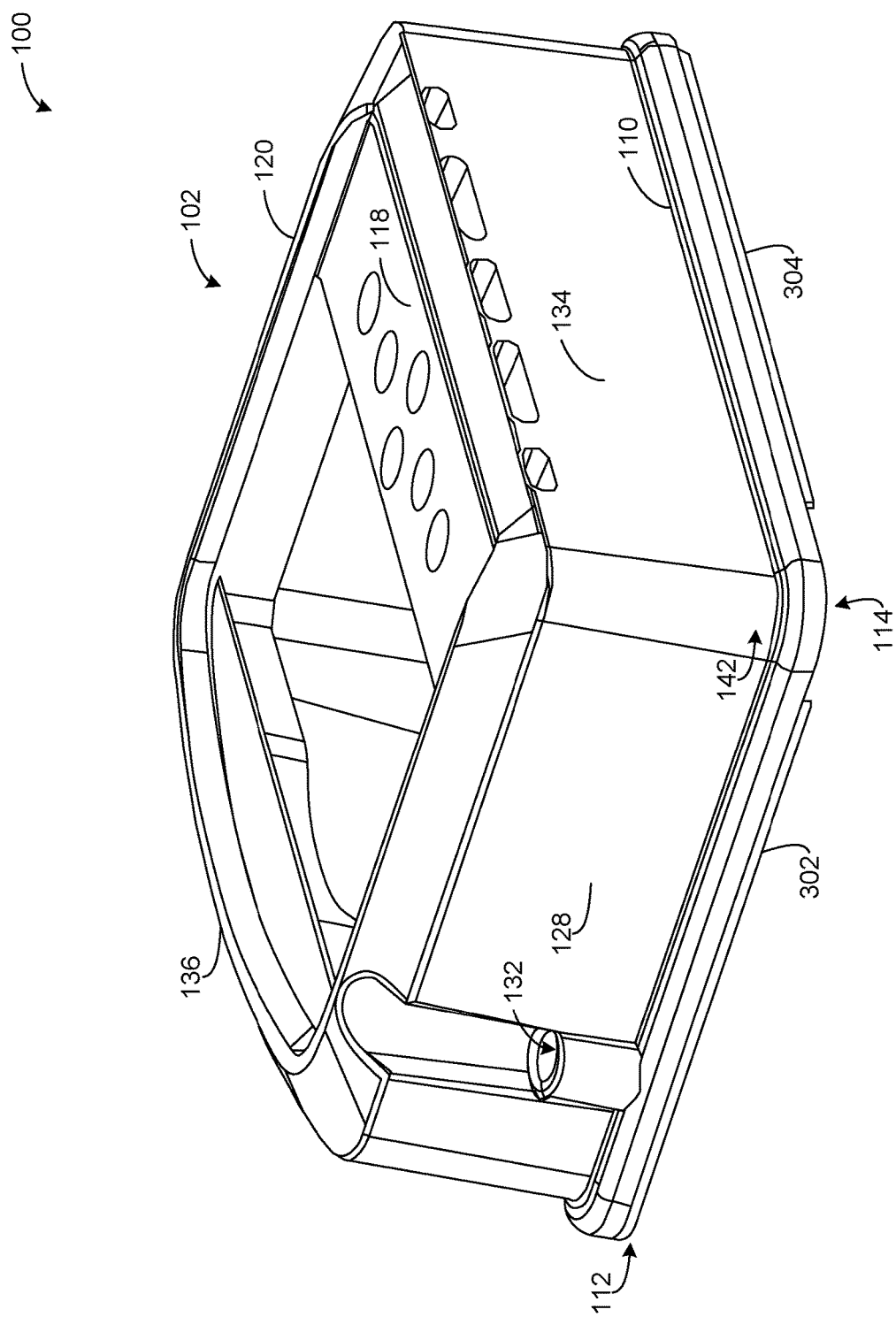
FIG. 3 illustrates a cover of the example housing of FIG. 1.

FIG. 3 illustrates the first portion 102 of the housing 100 of FIGS. 1 and/or 2. In the example of FIG. 3, the ridge 112 includes a first ridge portion 302 extending along at least a portion of the second sidewall 128 and a second ridge portion 304 extending along at least a portion of the third sidewall 134. As shown in FIG. 3, the first ridge portion 302 and the second ridge portion 304 form an overhang at the edge 110 of the first portion 102 of the housing 100. In the illustrated example of FIG. 3, the ridge 112 includes a rectangular cross-section. However, in some other examples, the ridge 112 includes a different shaped cross-section, such as a cross-section having a curvature.

Figure 4:
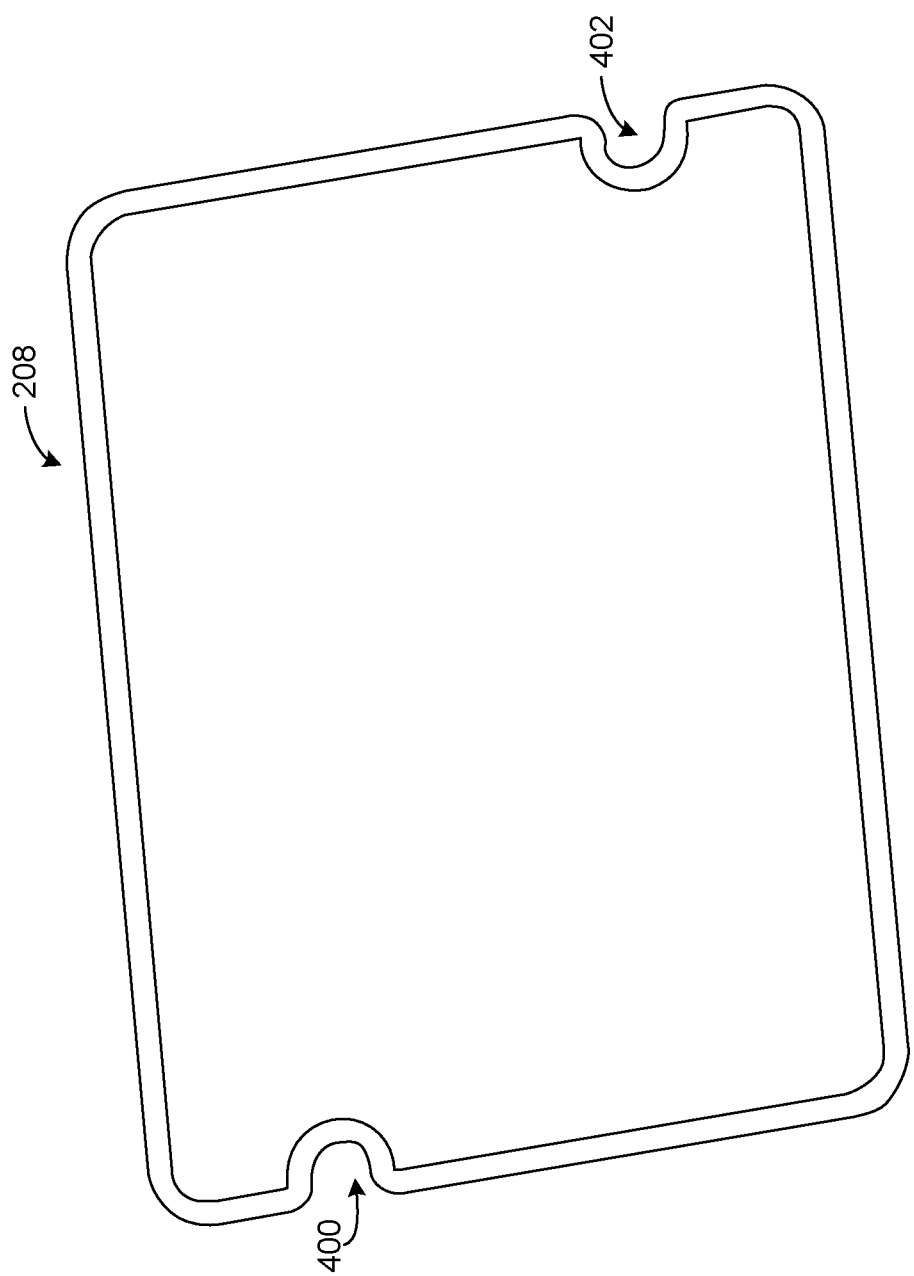
FIG. 4 illustrates a gasket of the example housing of FIG. 1.

As shown in the example of FIG. 3, the notch 114 extends from the second sidewall 128 of the first portion 102 of the housing 100 to the third sidewall 134 of the first portion 102. In FIG. 3, the notch 114 is formed as a cutout in the ridge 112 between the first ridge portion 302 and the second ridge portion 304 at the corner 142 of the first portion 102 of the housing. As a result of the cutout, the first and second ridge portions 302, 304 of the ridge 112 extend farther from the face 118 of the first portion 102 than the edge 110 at the location where the notch 114 is defined. FIG. 4 illustrates the example gasket 208 of FIG. 2 that is received in the groove 202 of the second portion 104 of the housing 100. In the illustrated example of FIG. 4, a shape of the gasket 208 corresponds or substantially corresponds to a shape of the groove 202 to provide the interior of the housing 100 with ingress sealing protection. For instance, the gasket 208 of FIG. 4 is substantially rectangular with a first curved portion 400 corresponding to a location at which the first opening 201 is defined in the first sidewall 122 of the second portion 104 to receive the first fastener 126 and a second curved portion 402 corresponding to a location at which the second opening 203 is defined in the second sidewall 130 of the second portion 104 to receive the second fastener 132. Although in examples disclosed herein the gasket 408 extends around a perimeter of the housing 100, in other examples, the gasket 408 extends around a portion of the perimeter.

Figure 5:
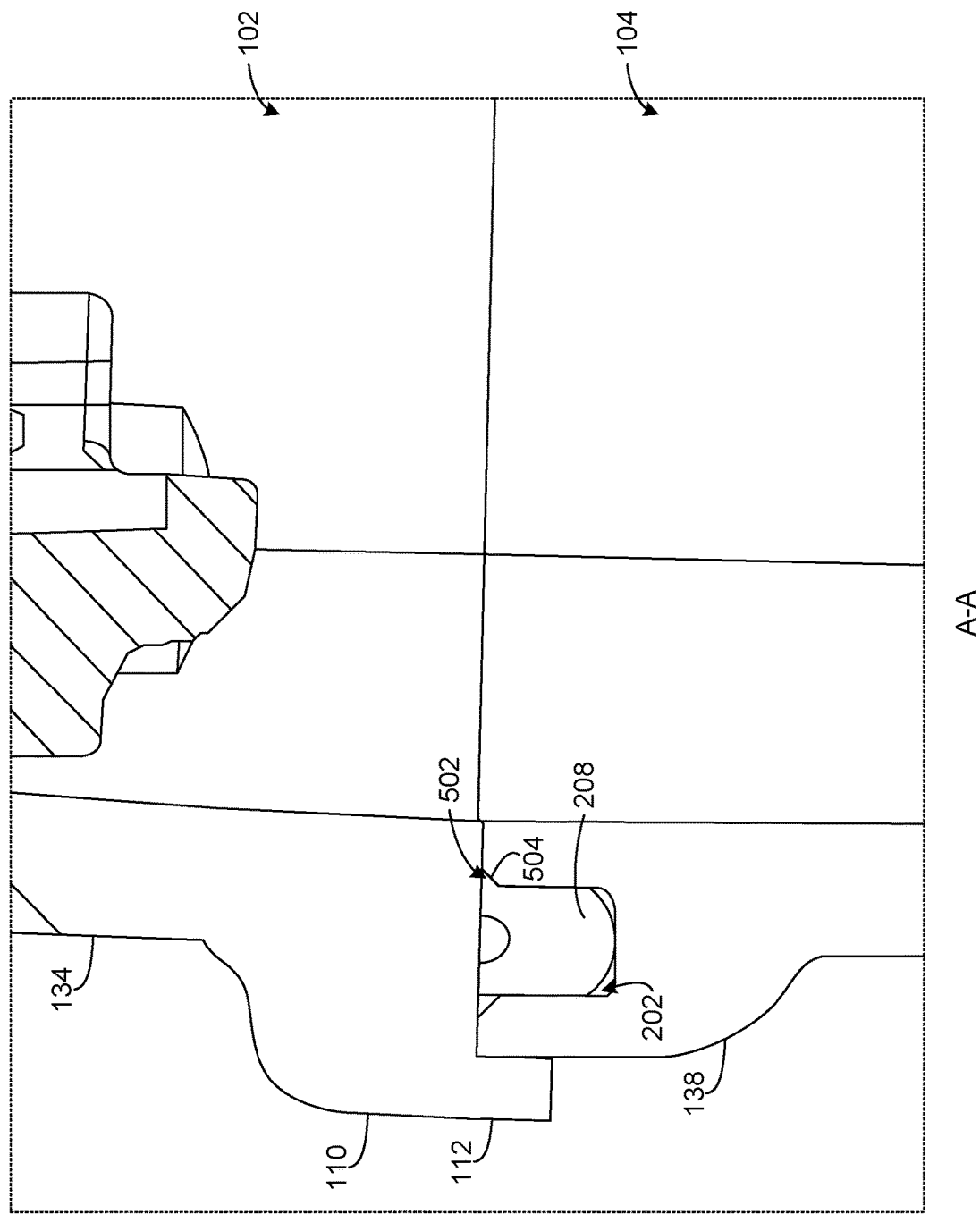
FIG. 5 is a cross-sectional view of a first portion of the example housing of FIG. 1 taken along the A-A line of FIG. 1.

FIG. 5 illustrates is a cross-sectional view of the housing 100 of FIG. 1 taken along the A-A line of FIG. 1 at the third sidewall 134 of the first portion 102 of the housing 100 and the third sidewall 138 of the second portion 104 of the housing 100 of FIG. 1. In particular, the illustrated example shows a cross-section of the example ridge 112 extending from the edge 110 of the first portion 102 of the housing 100 at the third sidewall 134 of the first portion 102 of the housing 100. Although the illustrated example of FIG. 5 shows the ridge 112 at the third sidewall 134 of the first portion 102, the ridge 112 is the same or substantially the same at the other sidewall(s) 120, 128, 136 of the first portion 102 of the housing 100.

In the example of FIG. 5, the edge 110 clamps the gasket 208 within the groove 202 when the first portion 102 of the housing is coupled to the second portion 104 of the housing (e.g., via the fastener(s) 126, 132 of FIG. 1). In some examples, the edge 110 causes at least a portion 502 of the gasket 208 to engage or press against a surface 504 defining the groove 202 to help maintain the position of the gasket 208 within the groove 202 and, thus, provide for sealing between the first portion 102 and the second portion 104 of the housing 100.

As illustrated in FIG. 5, the ridge 112 extends over the sidewall 138 of the second portion 104 of the housing 100 to prevent the gasket 208 from extruding from the groove 202 and/or the housing 100 when the first portion 102 of the housing 100 is coupled to the second portion 104 of the housing 100. Thus, the ridge 112 further facilitates sealing and ingress protection at the housing 100.

Figure 6:
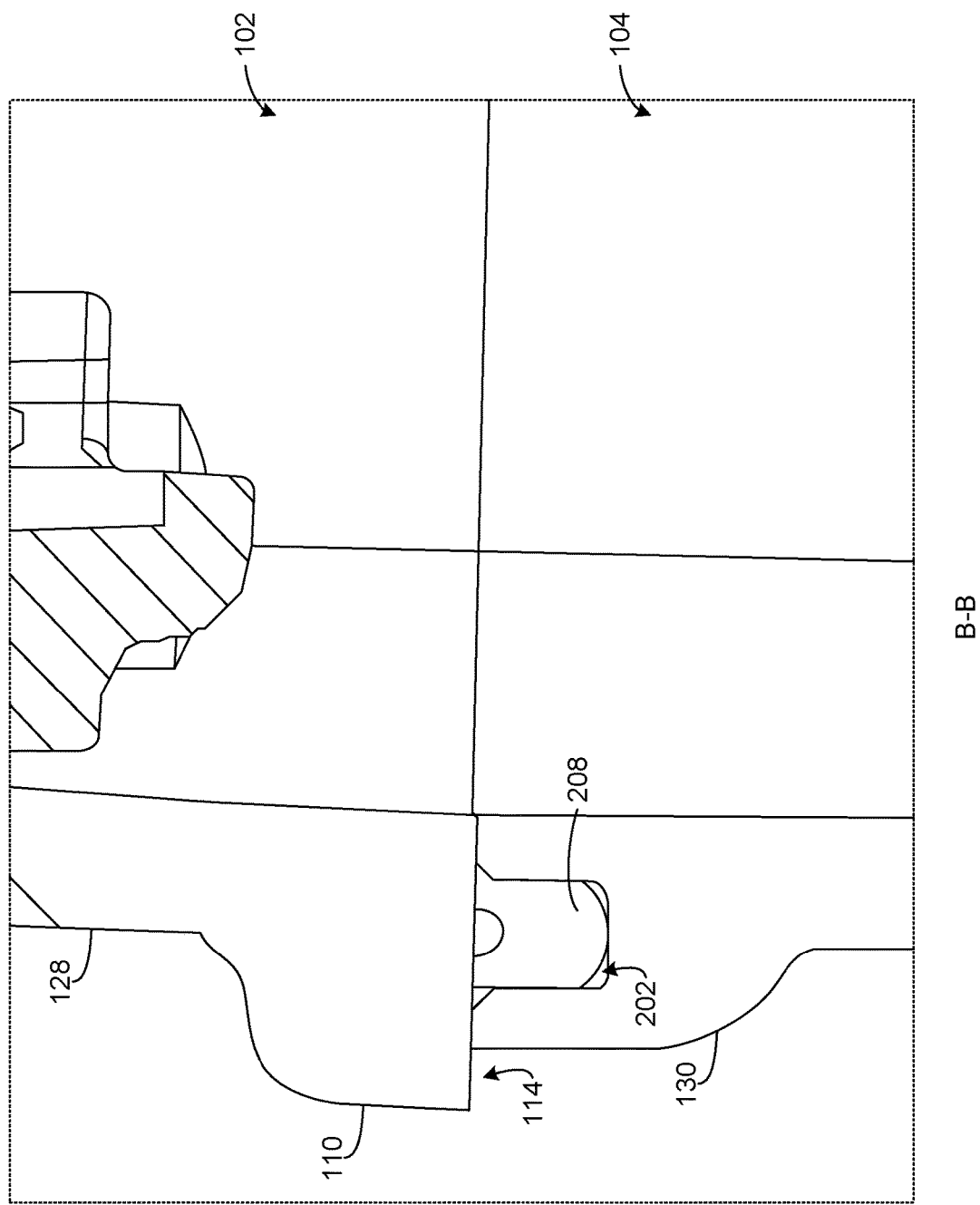
FIG. 6 is a cross-sectional view of a second portion of the example housing of FIG. 1 taken along the B-B line of FIG. 1.

FIG. 6 is a cross-sectional view of the housing 100 of FIG. 1 taken along the B-B line of FIG. 1 at the second sidewall 128 of the first portion 102 of the housing 100 and the second sidewall 130 of the second portion 104 of the housing 100 of FIG. 1. In particular, FIG. 6 shows a cross-section of a portion the example notch 114 defined in the ridge 112 of the edge 110 of the first portion 102 of the housing 100. As disclosed herein, in the examples of FIGS. 1-6, the notch 114 extends between the second sidewall 128 of the first portion 102 and the third sidewall 134 of the first portion 102 at the corner 142 of the first portion 102 of the housing 100 (FIGS. 1, 3).

As disclosed herein, the gasket 208 provides means for sealing the first portion 102 of the housing 100 and the second portion 104 of the housing 100 when the first portion 102 of the housing 100 is coupled to the second portion 104. Thus, a pressure within the housing 100 is contained withing the sealed housing 100.

In some examples, pressure inside the housing 100 increases due to, for instance, a pressure blockage at the outlet port 108 of the housing 100 (FIG. 1) and/or in the flow path between the inlet port 106 (FIG. 1) and the outlet port 108 of the housing 100. In some such examples, the pressure in the housing 100 can increase to an amount that may damage the housing 100 and/or the components (e.g., process control instruments) contained therein. In some instances, the pressure within the housing 100 could cause the housing 100 to rupture.

The notch 114 of the example housing 100 provides means for releasing pressure in the housing 100 in response to an occurrence of a pressure event (i.e., an amount of pressure above a threshold) in the housing 100. In particular, the notch 114 enables a portion of the gasket 208 to extrude from the groove 202 and/or the housing 100 in response to the pressure event. The extrusion of the gasket 208 enables the pressure within the housing 100 to be released at the notch 114. As such, the notch 114 prevents the housing 100, and/or the components within the housing 100 from damage due to a build-up of pressure in the housing 100.

The pressure threshold that defines a pressure event that causes a portion of the gasket 208 to extrude from the groove 202 and/or the housing 100 can be defined based on properties of the housing 100 and/or the components therein (e.g., propert(ies) of material(s) of the housing and/or the component(s) therein) and/or operating conditions for the components in the housing (e.g., a reference pressure). For instance, the pressure threshold can be defined as a pressure value that is less than a pressure at which damage (e.g., cracking, breakage) to an instrument in the housing 100 and/or the housing 100 would occur (e.g., as determined based on testing).

In some examples, the pressure threshold is defined based on properties of the gasket 208. As disclosed herein, the gasket 208 can include an elastomer such as a silicone or nitrile. The pressure threshold can be based on a durometer and/or a geometry of the gasket 208. For instance, silicone typically includes a reduced durometer as compared to nitrile, so the pressure threshold when the gasket 208 includes silicone may be reduced as compared to the pressure threshold when the gasket 208 includes nitrile. As another example, the pressure threshold that causes extrusion of a portion the gasket 208 can increase with an increase in a thickness of the gasket 208.

Figure 7:
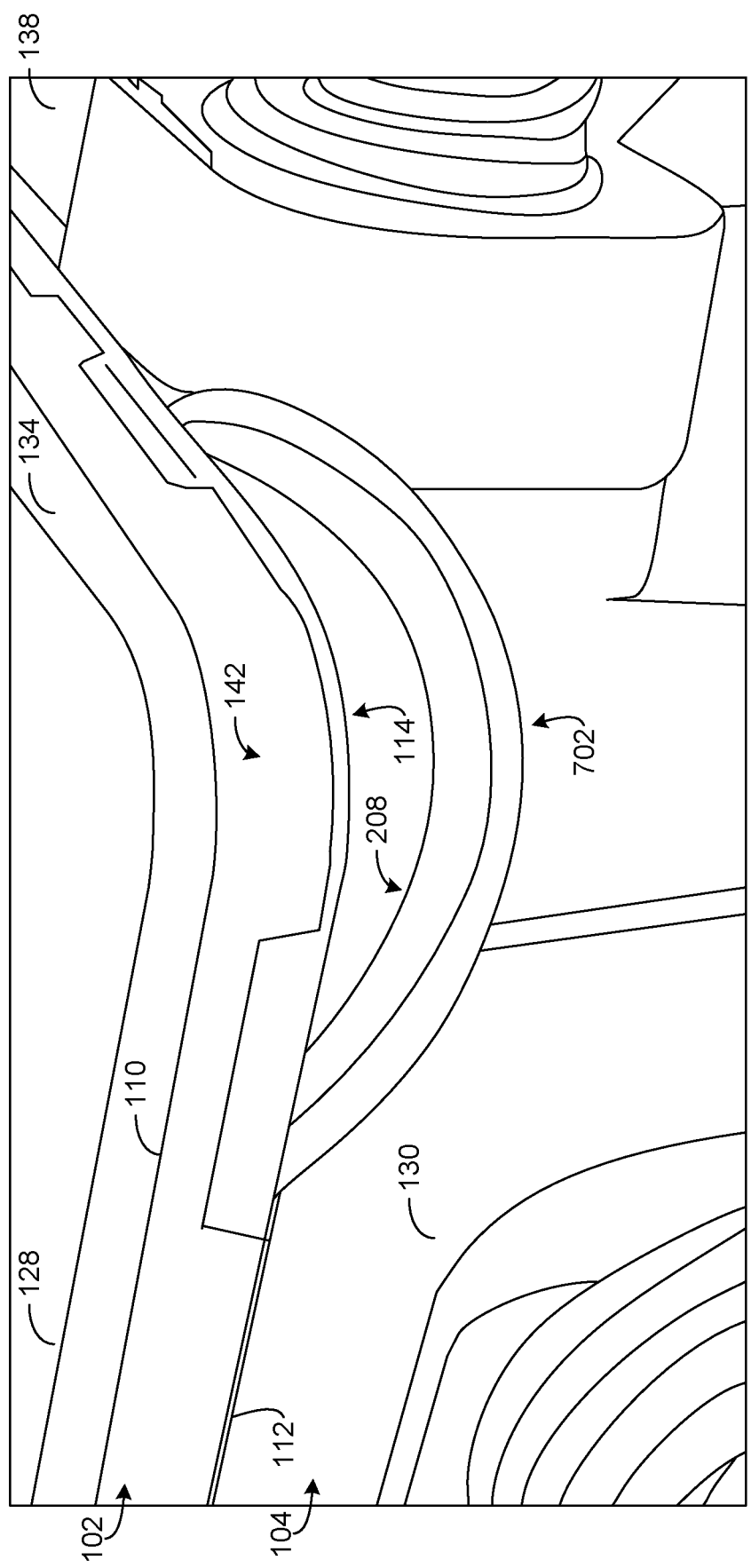
FIG. 7 illustrates a state of the gasket of FIG. 4 in response to a pressure event in the example housing of FIG. 1.

FIG. 7 illustrates the corner 142 of the housing 100 of FIGS. 1-3 including the notch 114 of the ridge 112. In particular, FIG. 7 shows a portion 702 of the gasket 208 extruded from the groove 202 and the housing 100 in response to a pressure within the housing 100 exceeding a threshold (i.e., in response to occurrence of a pressure event).

When pressure in the housing 100 is below the pressure threshold, the gasket 208 (including the extruded portion 702) is disposed within the groove 202, as shown in FIGS. 1 and 2. When the pressure in the housing 100 exceeds the pressure threshold, the notch 114 enables the portion 702 of the gasket 208 to extrude from the groove 202 in response to the increased pressure in the housing 100, as shown in FIG. 7. For example, the increased pressure in the housing 100 causes at least a portion (e.g., the corner 142) of the first portion 102 of the housing 100 to flex or move away from the second portion 104 of the housing 100. As a result, at least a portion of the edge 110 of the first portion 102 of the housing 100 separates from the second portion 104, which enables a portion of the gasket 208 to extrude from the groove 202. In some examples, the increased pressure in the housing 100 pushes the gasket 208 outward relative to the housing 100 (e.g., towards a perimeter of the housing 100). In some examples, at least a portion of the gasket 208 is lubricated, which facilitates movement of the gasket of the groove in response to the increased pressure in the housing 100. In the example of FIG. 7, the notch 144 enables the extruded portion 702 of the gasket 208 to be released from the housing 100 such that the extruded portion 702 extends over one or more of the sidewalls 130, 138 of the second portion 104. Thus, when a pressure within the housing 100 pushes the gasket 208 out of the groove 202, the notch 114 reduces forces exerted on the portion 702 of the gasket 208 as compared to portions of the gasket 208 at locations where the ridge 112 does not include the notch 114.

In FIG. 7, the extrusion of the portion 702 of the gasket 208 from the groove 202 (and, in some instances, the housing 100) allows pressure to be released from the housing 100. As a result, the extrusion of the portion 702 of the gasket 208 from the groove 202 prevents, substantially prevents, or otherwise minimizes damage to the housing 100 and the components within the housing 100. Further, in the example of FIG. 7, intrusion of water, dust, or other substances into the housing 100 is minimized by extrusion of only the portion 702 of the gasket 208. A material of the housing 100 can be selected to enable the first portion 102 of the housing to flex without breaking or otherwise causing damage to the housing 100. As disclosed herein, the pressure threshold can be defined such that the pressure causes a portion of the housing 100 to flex, but does not cause damage (e.g., cracking, breakage) to the housing 100.

In the example of FIG. 7, the extruded portion 702 of the gasket 208 is disposed external to the housing 100 and, thus, provides a visual indication of the occurrence of pressure event (e.g., to alert an operator). In some examples, the gasket 208 can be re-used and re-inserted back into the groove after, for instance, the blockage at the housing 100 is addressed.

Figure 8:
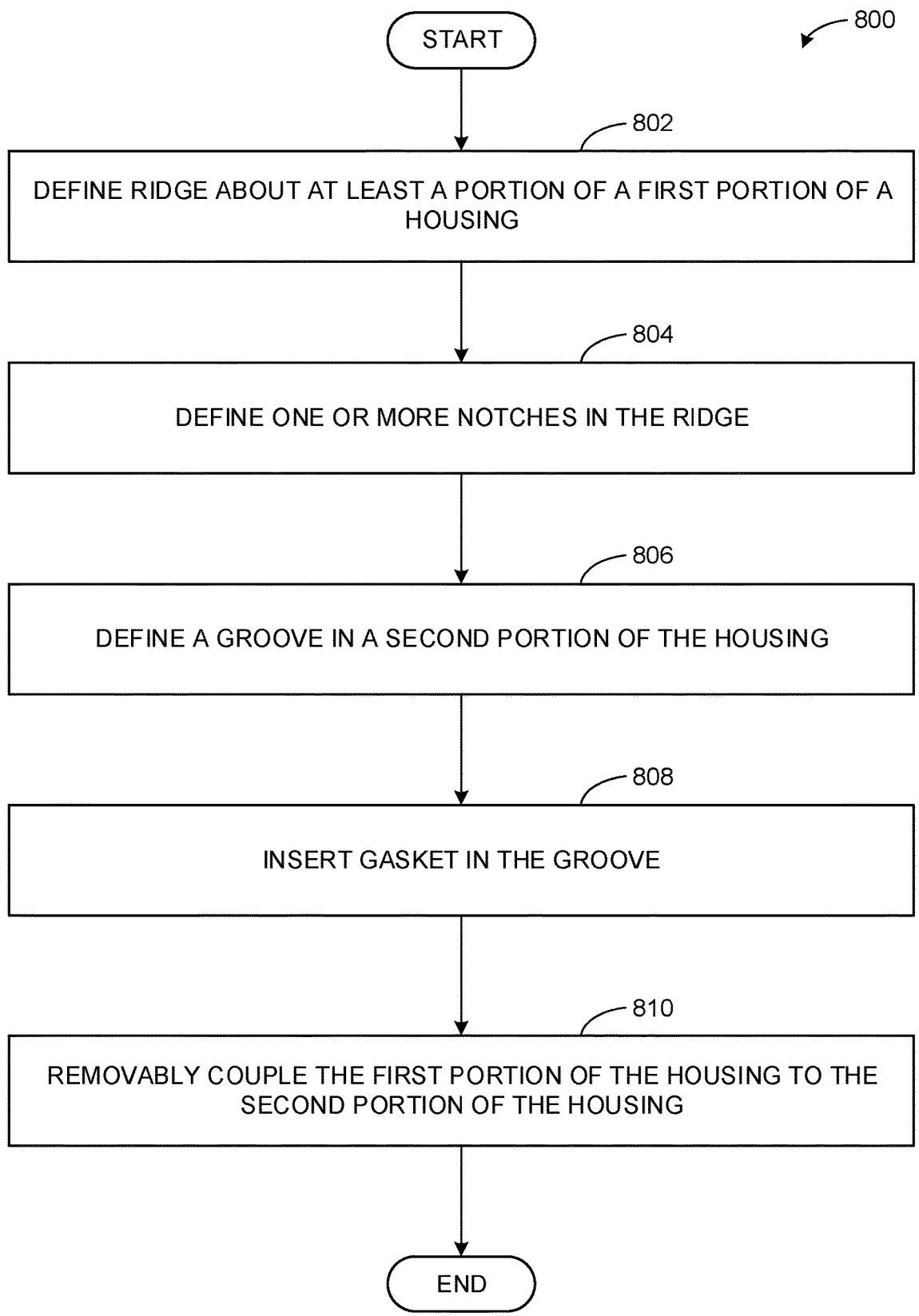
FIG. 8 is a flowchart of an example method to manufacture an instrument housing that provides for pressure relief in accordance with teachings of this disclosure.

FIG. 8 is a flowchart of an example method 800 to manufacture a housing (e.g., an instrument casing) that provides for pressure relief, such as the example housing 100 of FIGS. 1-7.

The example method of FIG. 8 includes defining a ridge about at least a portion of a first portion of a housing (block 802). For example, the ridge 112 is defined about at least a portion of the first portion 102 of the housing 100 of FIG. 1. In some examples, the ridge 112 is defined via a mold during manufacture of the housing 100. In other examples, the ridge 112 is coupled to the housing 100 in one or more pieces via chemical and/or mechanical fasteners.

In the example of FIG. 8, one or more notches are defined in the ridge (block 804). For example, portion(s) of the ridge 112 of FIG. 1 can be machined to define the one or more notches 114. In other examples, the ridge 112 includes two or more pieces and the notch 114 is defined between the separate pieces (e.g., at the corner 142 of the housing 100 of FIG. 1).

The example method 800 of FIG. 8 includes defining a groove in a second portion of the housing to receive a gasket (block 806). For example, the groove 202 is defined in the second portion 104 of the housing 100 between the interior surface 204 and the exterior surface 206 of the respective sidewalls 122, 130, 138, 140 of the second portion 104 of the housing 100. The sidewalls 122, 130, 138, 140 of the housing 100 can be machined to define the groove 202 therein. In some examples, the groove 202 is defined via extrusion with respect to surfaces of the housing 100.

The example method 800 includes inserting a gasket in the groove (block 808). For example, the gasket 208 is inserted into the groove 202 to provide for sealing of the housing 100 when the first and second portions 102, 104 are secured via the fasteners 126, 132.

The example method 800 includes removably coupling the first and second portions of the housing (block 810). For example, the first sidewall 120 of the first portion 102 of the housing 100 can be coupled to the first sidewall 122 of the second portion 104 of the housing 100 via the hinge 124 to enable the housing 100 to open and close about the hinge 124.

Although the example method 800 is described with reference to the flowchart illustrated in FIG. 8, many other methods of manufacturing the example housing 100 of FIGS. 1-7 may alternatively be used. For example, the order of execution of the blocks may be changed, and/or some of the blocks described may be changed, eliminated, or combined. Similarly, additional operations may be included in the manufacturing process before, in between, or after the blocks shown in FIG. 8.

From the foregoing, it will be appreciated that example methods, apparatus, and articles of manufacture have been disclosed that provide for pressure relief in protective casings. Examples protective housings disclosed herein include a first body removably coupled to a second body. A gasket is positioned in a groove or slot of the second body and provides ingress sealing protection when the first body and the second body are coupled. In examples disclosed herein, an edge of the first body includes a notch to enable a portion of the gasket to extrude from the groove in response to pressure buildup in the housing. As such, examples disclosed herein provide for ingress protection while enabling the release of pressure that could otherwise build up in the housing and cause damage to the housing and/or the components stored therein. Further, the extrusion of the gasket from the groove of the housing provides visual notification to an operator of, for instance, a process control system, of the occurrence of a pressure event in the housing.

Example methods, apparatus, systems, and articles of manufacture to manage pressure events in protective casings are disclosed herein. Further examples and combinations thereof include the following:

Example 1 includes an apparatus including a first body including a pressure inlet port, a pressure outlet port, and a groove defined in a wall of the first body, a gasket at least partially disposed in the groove, and a second body removably coupled to the first body, the first body and the second body defining a housing, an edge of the second body to extend over the wall of the first body, the edge including a lip, a portion of the lip including a notch defined therein to enable a portion of the gasket to extrude from the groove in response to a pressure event in the housing.

Example 2 includes the apparatus of example 1, wherein the pressure event is associated with a blockage in the pressure outlet port.

Example 3 includes the apparatus of example 2, wherein the extruded portion of the gasket is to be disposed external to the first body and the second body.

Example 4 includes the apparatus of example 1, wherein the second body is rectangular and a portion of the edge defines a corner of the second body, the notch disposed at the corner of the second body.

Example 5 includes the apparatus of example 1, further including a hinge to couple a first side of the first body to a first side of the second body, and a fastener to removably secure a second side of the first body to a second side of the second body, a portion of the notch defined at the second side of the second body when the first body is secured to the second body, the second side of the second body opposite the first side of the second body.

Example 6 includes the apparatus of example 1, wherein the edge of the second body is to clamp the gasket within the groove.

Example 7 includes the apparatus of example 1, wherein the pressure event is associated with a pressure in the housing exceeding a threshold.

Example 8 includes the apparatus of example 7, wherein the gasket includes an elastomer, the threshold to be defined based on one or more of a durometer or a geometry of the elastomer.

Example 9 includes the apparatus of example 8, wherein the elastomer is silicone or nitrile.

Example 10 includes an apparatus including a base including a wall defining a perimeter of the base, a slot defined in the wall and extending along the perimeter of the base, a gasket at least partially disposed in the slot, and a cover removably coupled to the base, the cover and the base defining a housing, the cover including a ridge, the ridge to extend around an exterior of the wall of the housing, a portion of the ridge including a notch defined therein to enable a portion of the gasket to extrude from the housing in response to a pressure event in the housing.

Example 11 includes the apparatus of example 10, further including a pressure inlet port defined in one of the base or the cover, and a pressure outlet port defined in one of the base or the cover.

Example 12 includes the apparatus of example 10, wherein the cover includes a first edge and a second edge, the first edge including a first portion of the ridge and the second edge including a second portion of the ridge, the notch disposed between the first portion of the ridge and the second portion of the ridge.

Example 13 includes the apparatus of example 10, wherein the extruded portion of the gasket is to be disposed external to the wall of the base and the cover.

Example 14 includes the apparatus of example 10, wherein the cover includes a first wall and a second wall adjacent the first wall, the notch extending from the first wall to the second wall.

Example 15 includes the apparatus of example 10, wherein a portion of the cover is to engage the gasket.

Example 16 includes an instrument housing including a body including a first portion including an inner wall and an outer wall, a cavity defined between the inner wall and the outer wall, and a second portion removably coupled to the first portion, the second portion including a ledge extending about an exterior of the second portion, the ledge to cover the cavity, and means for sealing supported by the cavity, the ledge including an indentation to enable a portion of the means for sealing to be released from the cavity in response to a pressure event in the body.

Example 17 includes the instrument housing of example 16, further including a hinge to couple the first portion and the second portion of the body at a first side of the body, the indentation defined at a second side of the body, the second side opposite the first side.

Example 18 includes the instrument housing of example 16, wherein the portion of the means for sealing is to rest external to the body when the portion is released from the cavity.

Example 19 includes the instrument housing of example 16, wherein the means for sealing includes a gasket.

Example 20 includes the instrument housing of example 19, wherein the pressure event is defined based on one or more of a geometry of the gasket or a durometer of the gasket.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first body including a pressure inlet port, a pressure outlet port, and a groove defined in a wall of the first body;
a gasket at least partially disposed in the groove; and
a second body removably coupled to the first body, the first body and the second body defining a housing, an edge of the second body to extend over the wall of the first body, the edge including a lip, a portion of the lip including a notch defined therein to enable a portion of the gasket to extrude from the groove in response to a pressure event in the housing.

2. The apparatus of claim 1, wherein the pressure event is associated with a blockage in the pressure outlet port.

3. The apparatus of claim 2, wherein the extruded portion of the gasket is to be disposed external to the first body and the second body.

4. The apparatus of claim 1, wherein the second body is rectangular and a portion of the edge defines a corner of the second body, the notch disposed at the corner of the second body.

5. The apparatus of claim 1, further including:
a hinge to couple a first side of the first body to a first side of the second body; and
a fastener to removably secure a second side of the first body to a second side of the second body, a portion of the notch defined at the second side of the second body when the first body is secured to the second body, the second side of the second body opposite the first side of the second body.

6. The apparatus of claim 1, wherein the edge of the second body is to clamp the gasket within the groove.

7. The apparatus of claim 1, wherein the pressure event is associated with a pressure in the housing exceeding a threshold.

8. The apparatus of claim 7, wherein the gasket includes an elastomer, the threshold to be defined based on one or more of a durometer or a geometry of the elastomer.

9. The apparatus of claim 8, wherein the elastomer is silicone or nitrile.

10. An apparatus comprising:
a base including a wall defining a perimeter of the base, a slot defined in the wall and extending along the perimeter of the base;
a gasket at least partially disposed in the slot; and
a cover removably coupled to the base, the cover and the base defining a housing, the cover including a ridge, the ridge to extend around an exterior of the wall of the housing, a portion of the ridge including a notch defined therein to enable a portion of the gasket to extrude from the housing in response to a pressure event in the housing.

11. The apparatus of claim 10, further including:
a pressure inlet port defined in one of the base or the cover; and
a pressure outlet port defined in one of the base or the cover.

12. The apparatus of claim 10, wherein the cover includes a first edge and a second edge, the first edge including a first portion of the ridge and the second edge including a second portion of the ridge, the notch disposed between the first portion of the ridge and the second portion of the ridge.

13. The apparatus of claim 10, wherein the extruded portion of the gasket is to be disposed external to the wall of the base and the cover.

14. The apparatus of claim 10, wherein the cover includes a first wall and a second wall adjacent the first wall, the notch extending from the first wall to the second wall.

15. The apparatus of claim 10, wherein a portion of the cover is to engage the gasket.

16. An instrument housing comprising:
a body including:
a first portion including an inner wall and an outer wall, a cavity defined between the inner wall and the outer wall; and
a second portion removably coupled to the first portion, the second portion including a ledge extending about an exterior of the second portion, the ledge to cover the cavity; and
means for sealing supported by the cavity, the ledge including an indentation to enable a portion of the means for sealing to be released from the cavity in response to a pressure event in the body.

17. The instrument housing of claim 16, further including a hinge to couple the first portion and the second portion of the body at a first side of the body, the indentation defined at a second side of the body, the second side opposite the first side.

18. The instrument housing of claim 16, wherein the portion of the means for sealing is to rest external to the body when the portion is released from the cavity.

19. The instrument housing of claim 16, wherein the means for sealing includes a gasket.

20. The instrument housing of claim 19, wherein the pressure event is defined based on one or more of a geometry of the gasket or a durometer of the gasket.

* * * * *